United States Patent
Karmakar et al.

(10) Patent No.: US 8,082,292 B2
(45) Date of Patent: Dec. 20, 2011

(54) METHOD AND SYSTEM FOR CENTRALIZED USER NOTIFICATION AND APPLICATION EXECUTION CONTROL

(75) Inventors: Srimantee Karmakar, Mississauga, CA (US); Jeffrey Christopher Rogers, Scarborough, CA (US); Kamen B. Vitanov, Mississauga, CA (US); Viera Bibr, Kilbride, CA (US); Michael Shenfield, Richmond Hill, CA (US); Bryan R. Goring, Milton, CA (US)

(73) Assignee: Research In Motion Limited, Waterloo, Ontario (CA)

(*) Notice: Subject to any disclaimer, the term of this patent is extended or adjusted under 35 U.S.C. 154(b) by 699 days.

(21) Appl. No.: 11/405,596

(22) Filed: Apr. 18, 2006

(65) Prior Publication Data

US 2007/0055770 A1    Mar. 8, 2007

Related U.S. Application Data

(60) Provisional application No. 60/672,090, filed on Apr. 18, 2005.

(51) Int. Cl.
*G06F 15/16* (2006.01)

(52) U.S. Cl. ............... 709/202; 709/201; 455/412.1; 455/412.2; 455/418

(58) Field of Classification Search ........... 709/217, 709/224, 201, 202; 455/412.1, 412.2, 418
See application file for complete search history.

(56) References Cited

U.S. PATENT DOCUMENTS

| | | | |
|---|---|---|---|
| 5,828,882 A * | 10/1998 | Hinckley | 719/318 |
| 6,151,708 A * | 11/2000 | Pedrizetti et al. | 717/173 |
| 6,219,694 B1 * | 4/2001 | Lazaridis et al. | 709/206 |
| 6,400,810 B1 * | 6/2002 | Skladman et al. | 379/93.24 |
| 6,401,138 B1 | 6/2002 | Judge et al. | |
| 6,457,046 B1 * | 9/2002 | Munakata | 709/216 |
| 6,507,589 B1 * | 1/2003 | Ramasubramani et al. | 370/465 |
| 6,584,502 B1 * | 6/2003 | Natarajan et al. | 709/224 |
| 6,631,363 B1 * | 10/2003 | Brown et al. | 707/1 |
| 6,742,127 B2 * | 5/2004 | Fox et al. | 726/10 |
| 6,859,829 B1 | 2/2005 | Parupudi et al. | |
| 6,868,451 B1 * | 3/2005 | Peacock | 709/231 |
| 6,891,811 B1 * | 5/2005 | Smith et al. | 370/310 |
| 7,209,955 B1 * | 4/2007 | Major et al. | 709/207 |
| 7,321,992 B1 * | 1/2008 | Vellore et al. | 714/47 |
| 7,366,505 B2 * | 4/2008 | Kasai et al. | 455/419 |
| 2002/0038337 A1 * | 3/2002 | Satomi et al. | 709/203 |
| 2002/0135472 A1 * | 9/2002 | Vong et al. | 340/540 |
| 2003/0182385 A1 * | 9/2003 | Suzuki | 709/206 |
| 2004/0061716 A1 * | 4/2004 | Cheung et al. | 345/710 |
| 2004/0209607 A1 * | 10/2004 | Stepanich et al. | 455/418 |
| 2005/0154759 A1 * | 7/2005 | Hofmeister et al. | 707/104.1 |
| 2006/0009198 A1 * | 1/2006 | Kasai et al. | 455/412.1 |
| 2006/0224681 A1 * | 10/2006 | Wurster | 709/206 |

FOREIGN PATENT DOCUMENTS

| | | |
|---|---|---|
| EP | 1713219 | 10/2006 |
| WO | 0106748 | 1/2001 |
| WO | 0109753 | 2/2001 |

* cited by examiner

*Primary Examiner* — Rupal Dharia
*Assistant Examiner* — Jimmy H Tran
(74) *Attorney, Agent, or Firm* — Norton Rose OR LLP

(57) ABSTRACT

A method for providing application-defined notifications to a user upon receipt of an event at a device is provided. A list of applications is centrally maintained, the list defining, for each application, event identification and corresponding event notification. Whenever an event is received and identified, the corresponding event notification for the event identification is dispatched to the user.

13 Claims, 3 Drawing Sheets

METHOD AND SYSTEM FOR CENTRALIZED USER NOTIFICATION AND APPLICATION EXECUTION CONTROL

CROSS-REFERENCE TO RELATED APPLICATIONS

This application is based on, and claims benefit of 35 U.S.C. §119(e) of Provisional Patent Application No. 60/672,090 filed Apr. 18, 2005, which is hereby incorporated by reference.

FIELD OF THE ART

The present application relates to management of event notifications in a runtime environment. More specifically, it relates to a method and system for centralized management of application-defined user notifications.

BACKGROUND OF THE ART

For wireless devices that interact through an event-based mechanism, whenever an event occurs for which the user's input is required in order to execute an action, the user must be notified of the event and provided with execution options. Events are linked to applications, such that on a specific event occurrence, a particular application will be responsible for carrying out a response, such as executing an appropriate action.

Current systems support applications that contain individually built and maintained user notification processes. The concept of applications requiring user notifications can be found in all of mobile, non-mobile, wireless & non-wireless systems. For non-handheld systems, Microsoft Outlook™ is an example of application with user notifications. For handheld devices, there can be other custom built applications by the vendor. Unfortunately, the systems themselves do not provide any means by which application-defined notifications to the user can be centrally maintained, dispatched and controlled.

Some of the drawbacks of current systems are that each application has to individually design and implement its own event capture and user notification mechanisms, and the application has to be running in order to capture the event and notify the user.

BRIEF DESCRIPTION OF THE DRAWINGS

These and other features, aspects and advantages of the present application will become better understood with regard to the following description and accompanying drawings wherein.

DETAILED DESCRIPTION

According to a broad aspect, there is provided a method for providing application-defined notifications to a user upon receipt of an event at a device, comprising: centrally maintaining a list of applications, the list defining, for each application, event identification and corresponding event notification; receiving an event, comprising event identification; and centrally dispatching to the user the corresponding event notification for the event identification.

According to another broad aspect, there is provided a system for providing application-defined event notifications to a user upon receipt of an event at a device. The system comprises a communication module for receiving the event; an event processor module for determining event identification information from the event; a storage module for storing event identification for registered applications and event notification corresponding thereto; and a control module for receiving the event identification from the event processor module, retrieving the event notification from the storage module and providing the event notification to the user.

Figure 1:
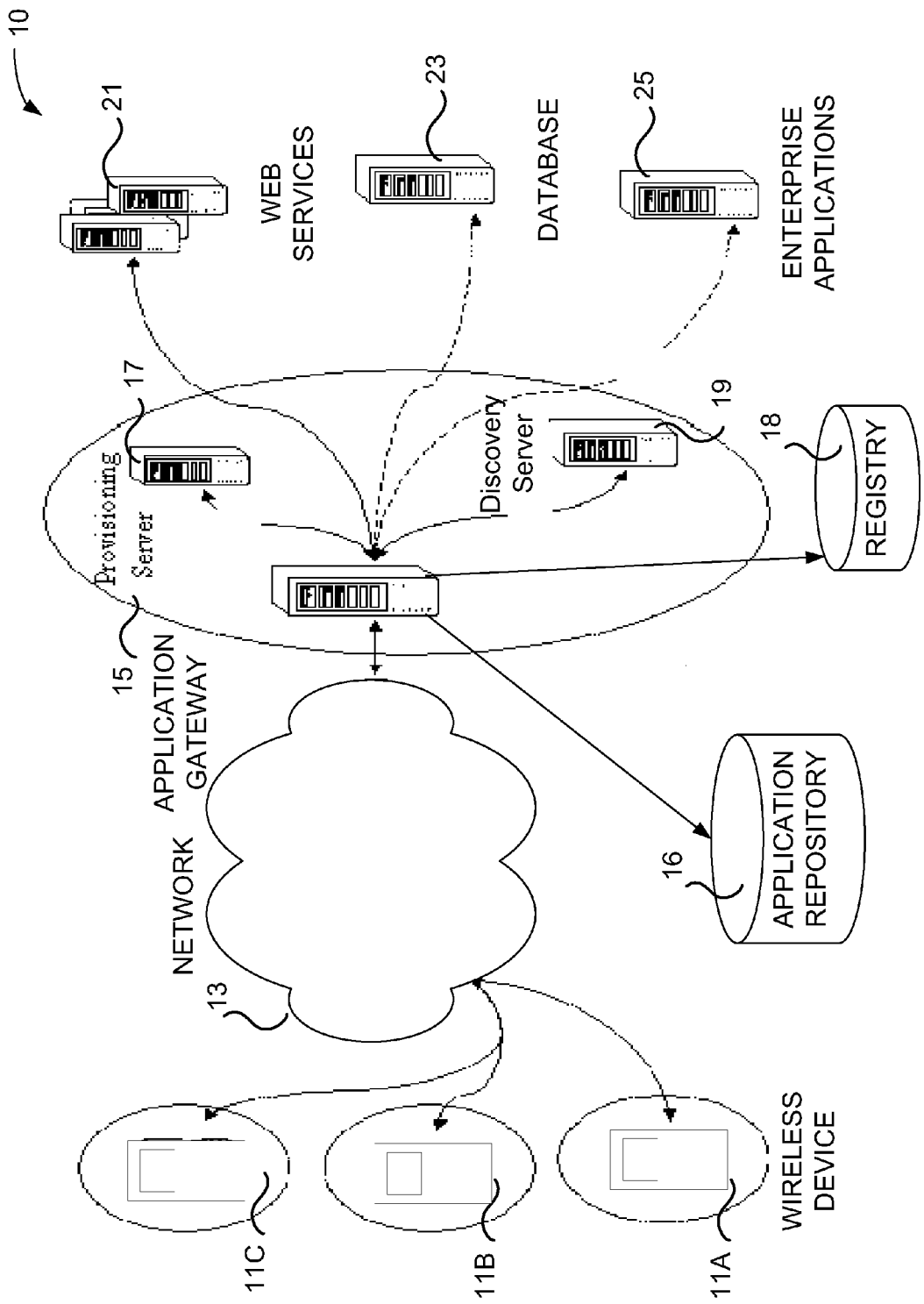
FIG. 1 is a block diagram of a communication network system incorporating the present application.

Referring to FIG. 1, a network system 10 comprises mobile communication devices 11A, 11B, 11C for interacting with one or more backend data sources 21, 23, 25 (e.g. a schema based service such as web services or database that provides enterprise services used by an application) via a wireless network 13 coupled to an application gateway 15. The devices 11A, 11B, 11C are devices such as, but not limited to, mobile telephones, PDAs, two-way pagers, dual-mode communication devices. The network 10 can also have desktop computers (not shown) coupled though a local area network. The devices 11A, 11B, 11C and desktop computers of the network 10 are hereafter referred to as the devices 11 for the sake of simplicity. It is recognized that the application gateway 15 and data sources 21, 23, 25 can be linked via extranets (e.g. the Internet) and/or intranets as is known in the art. The application gateway 15 handles request/response messages initiated by the applications on the devices, as well as subscription notifications pushed to the devices 11 from the data sources 21, 23, 25. The Application Gateway 15 can function as a Data Mapping Server for mediating messaging between a client runtime environment (RE) on the device 11 and a backend server of the data sources 21, 23, 25. The Runtime Environment (RE) is an intelligent container that executes application components and provides common services as needed for execution of the applications. The application gateway 15 can provide for asynchronous messaging for the applications and can integrate and communicate with legacy back-end data sources 21, 23, 25. The devices 11 transmit and receive wireless component applications, as further described below, when in communication with the data sources 21, 23, 25 via the Application Gateway 15, as well as transmit/receive messaging associated with operation of the applications. The devices 11 can operate as web clients of the data sources 21, 23 and 25 through execution of the applications when provisioned on respective runtime environments (RE) of the devices 11.

For satisfying the appropriate messaging associated with the applications, the application gateway 15 communicates with the data sources 21, 23 and 25 through various protocols (such as but not limited to HyperText Transfer Protocol (HTTP), Standard Query Language (SQL), and component Application Programming Interface (API)) for exposing relevant business logic (methods) to the applications once provisioned on the devices 11. The applications can use the business logic of the data sources 21, 23 and 25 similarly to calling a method on an object (or a function). It is recognized that the applications can be downloaded/uploaded in relation to data sources 21, 23, 25 via the network and application gateway 15 directly to the devices 11. For example, the application gateway 15 is coupled to a provisioning server 17 and a discovery server 19 for providing a mechanism for optimized over-the-air provisioning of the applications, including capabilities for application discovery from the device 11 as listed in a Universal Description, Discovery and Integration (UDDI) (for example) registry 18. In an embodiment, the devices 11 need not be in communication with data sources 21, 23, 25 to download an application, it need only be in communication with the application gateway 15. The registry 18 can be part of the discovery service implemented by the server 19, and the registry 18 is used for publishing the applications. The application information in the registry 18 can contain such as but not limited to a Deployment Descriptor (DD) (contains information such as application name, version, and description) as well as the location of this application in an application repository 16.

Figure 2:
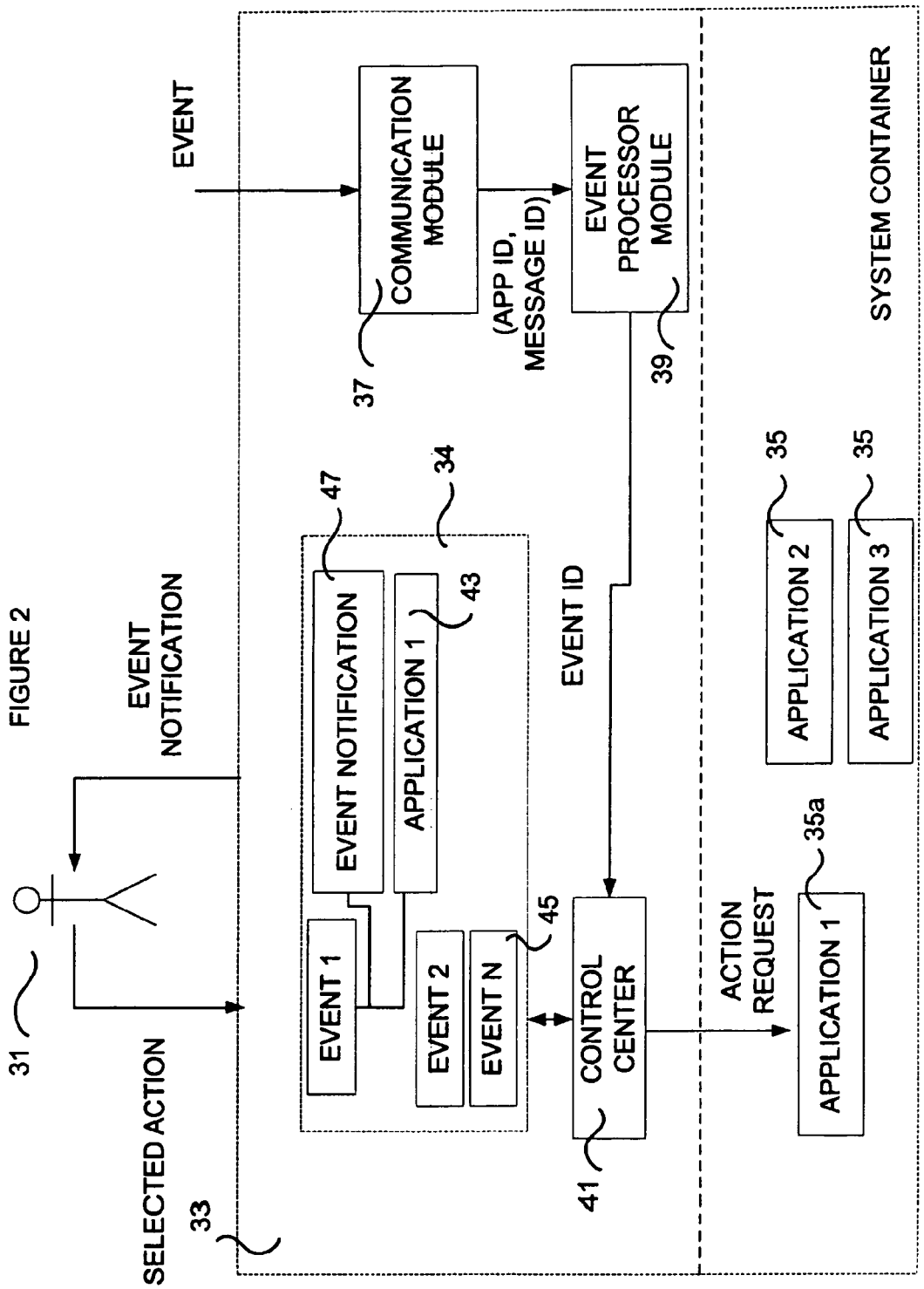
FIG. 2 is a block diagram of an application runtime environment upon receipt of an event, according to an embodiment of the present application.

Now, with respect to FIG. 2, which is an application runtime environment, upon receipt of an event, according to an embodiment, a system and method for providing centralized user notification and application execution control will be described. The system container 33 provides a system level service which, at the time of installation of each application, registers a plurality of events supported by the application and associated user notifications desired by the application. Alternatively, an application may cause registration (or unregistration) of events when it is run.

It is to be noted that, some events, like low memory, are generic to the system and shared by all applications. Others, like an incoming message for an application, are unique to an application. If the event is generic to the system, it is assigned an identification by the system. In a sample implementation, the event identification can be obtained by applications via the control centre or event processor. Multiple applications can register a (custom) notification to be dispatched for the same event. In the case of a unique event like an incoming message, the application would only specify the message it is registering as an event. The translation from <APP, MESSAGE> to event identification is still performed by the system, say the event processor module. This way when the message arrives, the event processor can appropriately translate the application and message IDs from the message to the same event ID.

An example of an event is an incoming message for an application. In one embodiment, inbound and outbound messaging for an application is also controlled by the system level container 33. The message is received at a communication/event listener module 37. Since all applications use the same centralized communication module 37, all received messages have the same message structure. The communication module 37 is therefore able to recognize the format of an incoming message and extract an identification of the application for which the message is destined (APP ID) and an identification code of the message itself (MESSAGE ID). The communication module 37 sends the <APP ID, MESSAGE ID> information to the event processor module 39. The event processor module 39 translates <APP ID, MESSAGE ID> information to an <event ID>.

In one embodiment, whenever there is a registered listener for an incoming event, the event processor module 39 provides the event identification and the application identification to a control center 41.

The control center 41 has access to a list of applications 43, a set of event identifications 45 and corresponding application-defined notifications 47 for each of the events. Applications 35a, 35b and 35c (which will be referred to hereinafter as applications 35) register with the control center 41 as listening for a particular event or a plurality of events. In one embodiment, the event identification and the corresponding event notification are stored as a mapping table 34. The mapping table 34 allows to retrieve, given an event ID, the APP ID and the corresponding event notification 47.

Registration therefore includes the step of adding an event for the applications 35 to the mapping table 34 of the system container 33 and associating the event 45 with a corresponding event notification 47. At the time of registration, the corresponding event notification is also defined. The notification properties can include, but are not limited to: i) should the notification be dispatched if the application is running as the foreground application, ii) should the notification be dispatched if the application is running, but not as the foreground application, iii) should the notification be dispatched if the application is not running, iv) if dispatched when the application is not running, should the notification give the user the option to start the application, and v) the presentation properties of the notification—i.e., should it cause the device to emit a sound (e.g., to "beep"), display an indicator next to the application's name/icon on the device's home screen, display a dialog with some custom message, etc.

Event notifications 47 may be dispatched even when a particular application 35 is not running, as the notification may give the user 31 the option of starting the application 35. In the case of an incoming message, the message may provide new data to the application 35 or it may be an information request. If the application 35 is not running when a particular message arrives, the user 31 still needs to be notified in order to take appropriate action, e.g. view the new data or send the requested information. In one embodiment, event-related notifications for an application may be ignored if the application is running in the foreground, as the message will be processed and the result will be visible to the user 31 immediately.

Similarly, the control center 41 dispatching the notification 47 may choose to ignore some of the presentation properties of the notification 47. For example, if a notification 47, containing both 'beep' and 'display dialog' properties, is to be dispatched when an application 35 is running in the foreground, the 'beep' property may be ignored.

In the particular embodiment described, the event processor module 39 passes the <event ID> to the control centre 41 which can look up the associated notification(s). The event processor module 39 does not need to provide the <APP ID> information as this will be available to the control centre 41 from its mapping table 34.

The control centre 41 handles installation/upgrade/deletion of applications. More specifically, the control centre 41 provides a lifecycle management service, including event notification dispatching and application execution control. In one embodiment, the communication/messaging module 37 can interact directly with the control center 41 in order to provide message-related event information. The control center 41 translates <APP ID, MESSAGE ID> to a specific event type and dispatches the associated notification. If the application is not running and the user elects to start the application as a result of the notification, it is the lifecycle service of the control center 41 that will start the application.

Alternatively, the event processor module 39 dispatches the associated notification(s), if any, instead of requiring the control centre 41 to do so. If the application is not running and the user elects to start the application as a result of the notification, the event processor module 39 will provide the control centre 41 with the <APP ID> and request it to start the associated application.

In an embodiment, the communication module 37, the event processor module 39 and the control centre module 41 are part of the same container, referred to herein as the system container 33. Applications, when running, run in their own separate containers. However, an application container can still interact with the system container 33, which enables it to use centralized services such as the communication module 37, etc.

For a wireless handheld device, examples of user notifications are beeping, vibration, display of a dialog with text, appearance or modification of an icon on the main screen or a combination of these.

A user 31 receives the appropriate event notification and can ignore it or respond with an action. For example, a displayed dialog box can contain an option to start a specific application. If the user chooses to start the application, the action is received by the control center 41 of the application container that dispatched the notification. The control center 41 then places an action request to start the appropriate application.

Another example of an event is a transition of the system to a "low memory" state, triggered upon creation and storage of new data by the user 31. An application can define a notification 47 for this event 45 containing options for data deletion in order to free up memory. Based on the action chosen by the user 31, the control center 41 can request the application to perform data cleaning operations.

Yet another example of an event 45 can be the transition of the system to an "out of coverage" area. For example, a chat application that is running on the device at the time that an "out of coverage" event is received, can notify the user 31 with a custom message that the chat conversation will be interrupted. When the device returns to a coverage area, the application will notify the user 31 that the conversation can be resumed. If the chat application is no longer running at that time, the user 31 may have the option of starting the application.

Yet another example of an event 45 is a low battery notification. All wireless devices generally have a warning system to notify the user when battery resources are running low. With an event, an application 35 can customize its warning to the user 31. Only specific applications would care about losing data and would only want to dispatch a warning if the application is running. The user 31 might be given the option of saving specific data/messages before the battery is completely depleted.

Figure 3:
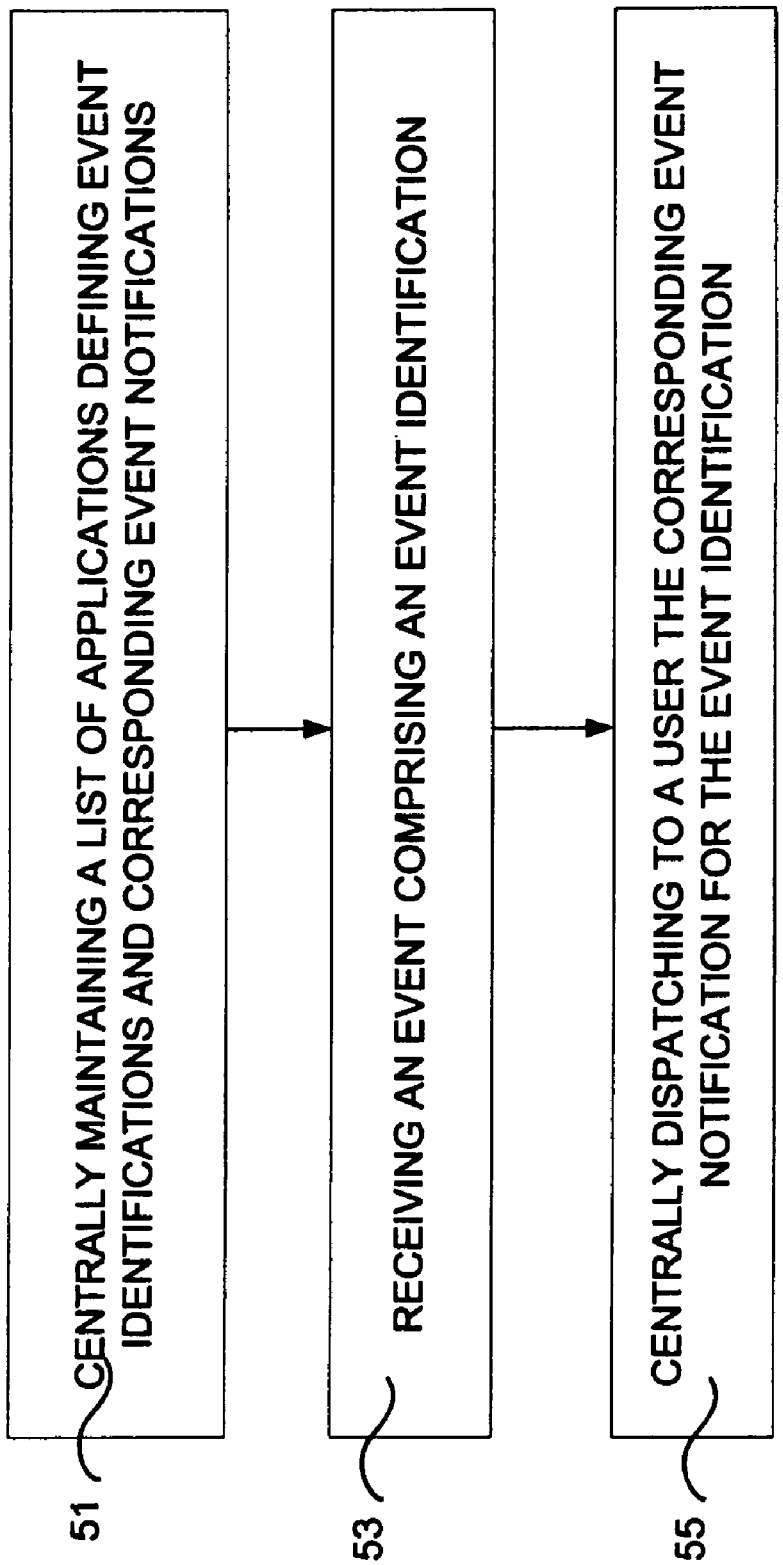
FIG. 3 is a flowchart of a method for providing application-defined notifications to a user upon receipt of an event at a device, according to the present application.

Now, with respect to FIG. 3, the method for providing application-defined event notifications upon receipt of an event at a device according to an embodiment will be described. In a first step 51, a list of applications defining event identifications and corresponding event notifications are centrally maintained. In a next step 53, an event is received comprising an event identification. Finally, in step 55, the corresponding event notification for the event identification is centrally dispatched to a user.

While illustrated in the block diagrams as groups of discrete components communicating with each other via distinct data signal connections, it will be understood by those skilled in the art that the embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, a computer readable medium or an electrical or electro-magnetical signal.

It will be understood that numerous modifications thereto will appear to those skilled in the art. Accordingly, the above description and accompanying drawings should be taken as illustrative and not in a limiting sense. It will further be understood that it is intended to cover any variations, uses, or adaptations following, in general, the principles of the application and including such departures from the present disclosure as come within known or customary practice within the art to which the application pertains and as may be applied to the essential features herein before set forth, and as follows in the scope of the appended claims.

What is claimed is:

1. A method for use in a mobile communication device providing application-defined notifications to a user upon receipt of an event in the mobile communication device, comprising:

maintaining, in a system container of an application runtime environment of the mobile communication device, a mapping of applications for said user, said mapping comprising, for each application, at least one event identification and one or more corresponding event notifications;

receiving an event in a communication module of the system container;

extracting, from the received event, code identifying the event and an identification of an application associated with the event;

based on said mapping of applications maintained in the system container and the code identifying the event and the identification of an application associated with the event, retrieving a corresponding event notification; and dispatching from the system container said corresponding event notification, said event notification being dispatchable even when a corresponding application is not running for said corresponding event notification.

2. The method as claimed in claim 1, further comprising:

receiving from said user an action in response to said notification; and requesting that said application performs an operation corresponding to said action.

3. The method as claimed in claim 1, wherein said mobile communication device comprises a wireless handheld device.

4. The method as claimed in claim 1, wherein said maintaining in the system container of the application runtime environment of the mobile communication device the mapping of applications comprises:

for each application, registering one or more event identifications and corresponding event notifications at a time of installing said application.

5. The method as claimed in claim 1, wherein said corresponding event notification comprises at least one of emitting a sound, vibrating, display of a dialog with text and appearance of an icon on a main screen of said mobile communication device.

6. A system for providing application-defined event notifications to a user upon receipt of an event at a device, said system including a system container of an application runtime environment resident in a memory of the device for execution by a processor of the device, the system comprising:

a communication module for receiving said event and extracting, from the received event, code identifying the event and an identification of an application associated with the event;

a storage module for storing a mapping of applications, said mapping comprising, for each application, at least one event identification and one or more corresponding event notifications; and a control module for retrieving, based on said mapping of applications and the code identifying the event and the identification of the application associated with the event, a corresponding event notification, and dispatching from the system container said corresponding event notification, said event notification being dispatchable by said control module even when a corresponding application is not running for said corresponding event notification.

7. A non-transitory computer-readable storage medium on which is stored machine readable code for executing a method for use in a mobile communication device providing application-defined notifications to a user upon receipt of an event, the mobile communication device having a processor connected to the computer-readable medium, said method comprising:

maintaining, in a system container of an application runtime environment of the mobile communication device, a mapping of applications for said user, said mapping comprising, for each application, at least one event identification and one or more corresponding event notifications;

receiving an event in a communication module of the system container;

extracting, from the received event, code identifying the event and an identification of an application associated with the event;

based on said mapping of applications maintained in the system container and the code identifying the event and the identification of an application associated with the event, retrieving a corresponding event notification; and dispatching from the system container said corresponding event notification, said event notification being dispatchable even when a corresponding application is not running for said corresponding event notification.

8. The non-transitory computer-readable storage medium as claimed in claim 7, wherein the method further comprises:

receiving from said user an action in response to said notification; and requesting that said application performs an operation corresponding to said action.

9. The non-transitory computer-readable storage medium as claimed in claim 7, wherein said mobile communication device comprises a wireless handheld device.

10. The non-transitory computer-readable storage medium as claimed in claim 7, wherein said maintaining in the system container of the application runtime environment of the mobile communication device the mapping of applications comprises:

for each application, registering one or more event identifications and corresponding event notifications at a time of installing said application.

11. The non-transitory computer-readable storage medium as claimed in claim 7, wherein said corresponding event notification comprises at least one of emitting a sound, vibrating, display of a dialog with text and appearance of an icon on a main screen of said mobile communication device.

12. The system of claim 6, wherein said device comprises a wireless handheld device.

13. The system of claim 12, the wireless handheld device comprising the function of at least one of: emitting a sound, vibrating, displaying a dialog with text, and displaying an icon on a main screen of a mobile communication device.

* * * * *